(12) United States Patent
Kockmann et al.

(10) Patent No.: US 7,079,496 B1
(45) Date of Patent: Jul. 18, 2006

(54) METHOD AND DEVICE FOR EFFECTIVE DATA RADIO TRANSMISSION

(75) Inventors: Juergen Kockmann, Duesseldorf (DE); Anton Kruk, Hamminkeln (DE); Hermann-Josef Terglane, Heek (DE); Uwe Sydon, Duesseldorf (DE); Peter Schliwa, Hamminkeln (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/446,545

(22) PCT Filed: Aug. 14, 1997

(86) PCT No.: PCT/DE97/01740

§ 371 (c)(1),
(2), (4) Date: Mar. 16, 2001

(87) PCT Pub. No.: WO98/59439

PCT Pub. Date: Dec. 30, 1998

(51) Int. Cl.
*H04J 3/00* (2006.01)

(52) U.S. Cl. .................. 370/280; 370/337; 370/347

(58) Field of Classification Search ........ 370/345, 370/347, 280, 328, 337, 329–331, 336, 436, 370/437, 442, 278, 282
See application file for complete search history.

(56) References Cited

U.S. PATENT DOCUMENTS

| 5,390,166 A * | 2/1995 | Rohani et al. ............ 370/330 |
| 5,452,115 A * | 9/1995 | Tomioka .................... 398/75 |
| 6,434,183 B1 * | 8/2002 | Kockmann et al. ........ 370/347 |
| 2001/0043583 A1 * | 11/2001 | Sakoda et al. ............ 370/347 |

FOREIGN PATENT DOCUMENTS

| EP | 0 767 551 A2 | 4/1997 |
| GB | 2 295 930 A | 6/1996 |

OTHER PUBLICATIONS

Rasky et al., "Slow Frequency-Hop TDMA/CDMA for Macrocellular Personal Communications", IEEE Personal Communications, pp. 26-35.

* cited by examiner

*Primary Examiner*—Chau Nguyen
*Assistant Examiner*—Soon D. Hyun
(74) *Attorney, Agent, or Firm*—Bell, Boyd & Lloyd LLC

(57) ABSTRACT

The invention relates to a method and a device for digital data radiotransmission between a fixed station (1) and at least one mobile station (2, 3) at one or several carrier frequencies (F1, F2 . . . ), wherein the data is transmitted in several time slots (Z1, Z2 . . . ) according to the time-multiplex technique. A specific amount of time is required to change from one carrier frequency to another carrier frequency using a slow-hopping HF module. The data is transmitted in an active followed by an inactive time slot during which no data is transmitted and which is sufficient for the HF module to program the frequency for the following active time slot. According to the invention, an inactive time slot is shorter than an active time slot.

8 Claims, 2 Drawing Sheets

METHOD AND DEVICE FOR EFFECTIVE DATA RADIO TRANSMISSION

The present invention relates to a method and an arrangement for effective radio transmission of data between a fixed station and at least one mobile station at one of a number of carrier frequencies, the data being transmitted in time slots using a time-division multiplex method (TDMA).

The DECT Standard was adopted at the start of the 1990's in order to replace the various existing analog and digital standards in Europe. This is the first common European standards for cordless telecommunications. A DECT network is a microcellular, digital mobile radio network for high subscriber densities. It is primarily designed for use in buildings. However, it is also possible to use the DECT Standard outdoors. The capacity of the DECT network of around 10,000 subscribers per square kilometer provides, from the cordless Standard, ideal access technology for network operators. According to the DECT Standard, it is possible to transmit both voice and digital signals. Thus, cordless data networks can also be built on a DECT basis.

The DECT Standard will be explained in more detail in the following text with reference to FIG. 2. A digital, cordless telecommunications system for ranges of less than 300 m has been standardized for Europe under the designation DECT (Digital Enhanced Cordless Tele-communication). In conjunction with the switching function of a telecommunications system, this system is therefore suitable for mobile telephone and data traffic in an office building or on a commercial site. The DECT functions supplement a telecommunications installation, and thus make it the fixed station FS of the cordless telecommunications system. Digital radio links between the fixed station FS and a maximum of 120 mobile stations MS can be produced, monitored and controlled on up to 120channels.

A maximum of ten different carrier frequencies (carriers) are used for transmission in the frequency range from 1.88 GHz to 1.9 GHz. This frequency-division multiplex method is called FDMA (Frequency Division Multiple Access).

Twelve channels are transmitted successively in time on each of the ten carrier frequencies using the time-division multiplex method TDMA (Time Division Multiple Access). Cordless telecommunication in accordance with the DECT Standard using ten carrier frequences with, in each case, twelve channels per carrier frequency provides a total of 120 channels. Since one channel is required, for example, for each voice link, there are 120 links to the maximum of 120 mobile stations MS. The duplex method (TTD) is used on the carriers. Once the twelve channels (channels 1–12) have been transmitted, the system switches to receive, and the twelve channels (channels 13–24) in the opposite direction are received.

A time-division multiplex frame thus comprises 24 channels (see FIG. 2). In this case, channel 1 to channel 12 are transmitted from the fixed station FS to the mobile stations MS, while channel 13 to channel 24 are transmitted in the opposite direction, from the mobile stations MS to the fixed station FS. The frame duration is 10 ms. The duration of a channel (time slot) is 417 µs. 320 bits of information (for example voice) and 100 bits of control data (synchronization, signalling and error check) are transmitted in this time. The useful bit rate for a subscriber (channel) results from the 320 bits of information within 10 ms. It is thus 32 kilobits per second.

Integrated modules have been developed to carry out the DECT functions for fixed and mobile stations. In this case, the fixed station and the mobile station carry out similar functions. One of these said integrated modules is in this case the RF module, that is to say the module which carries out the actual function of receiving and transmitting the RF band.

It is known for so-called fast hopping RF modules to be used, that is to say RF modules which can carry out a change in the carrier frequency from one time slot or channel to the next. These fast hopping RF modules are intrinsically very complex and costly. Thus, in practice, so-called slow hopping RF modules are mainly used, that is to say modules which require a certain amount of time to change the carrier frequency for the next time slot. The time period which the slow hopping RF module requires to change the carrier frequency corresponds essentially to the time period of one time slot. This means that, after each active time slot, that is to say after each slot in which data are transmitted, a so-called inactive time slot (blind slot) must follow, in which no data can be transmitted. This means that, in practice, only six links are available on one carrier frequency to the DECT standard, instead of the twelve possible links.

A DECT channel is defined by its time slot and its carrier frequency. In this case, it should be noted that, according to the DECT Standard, the organization to reuse physical channels is carried out by means of dynamic channel selection. This means that there is no need for any complex frequency planning, as in cellular systems. To set up a link, the signal levels of all the channels are measured continuously, and the interference-free channels are controlled in a channel list (channel map). While a link exists, the signal levels of all the channels and the reception quality continue to be monitored. If this monitoring indicates that the channel currently being used has been transmitted at a carrier frequency which is subject to interference (for example as a result of the influence of a transmission at the same carrier frequency from or to another fixed station), another carrier frequency is automatically selected for the next active time slot, and is entered in the channel list as being interference-free.

As an alternative, a so-called frequency hopping method can also be used, in which the carrier frequency is changed after a predetermined time period, for example a transmission frame.

For nations outside Europe, the DECT Standard may need to be modified and matched to local conditions. For example, in the USA, the normal DECT band between 1.88 and 1.90 GHz cannot be used for transmission, and the generally accessible 2.4 GHz ISM band (Industrial, Scientific, Medical) is available instead of this. Furthermore, changes would have to be carried out for matching to the national standards, such as the American Standard "FCC part 15" (Federal Communications Commission). This American Standard describes the transmission method, transmission powers and available bandwidth allowed for the radio interface.

In the DECT Standard, in addition to the 320 information bits mentioned above, each time slot also contains another 104 bits required for signal transmission, as well as 56 bits in a guard field, so that each time slot contains a total of 480 bits. This results in a data rate of (24×480 bits)/10 ms=–1 152 000 bits/s. A data rate at this level is pointless in the American ISM band, since the bandwidth required per usable channel would be too large.

SUMMARY OF THE INVENTION

The present invention thus has the object of providing a method and an arrangement for digitial radio transmission of data, which uses the bandwidth of a TDMA system effectively. The method and the arrangement are intended to allow, in particular, cost-effective use of the said slow hopping RF modules.

This object is achieved in accordance with the present invention is a method for digital radio transmission of data between a fixed station and at least one mobile station at one of a number of carrier frequencies, said method comprising the steps of: transmitting data in a number of time slots using a time-division multiplex method, said data being transmitted in active time slots each of which is followed by an inactive time slot in which no data is transmitted, said inactive time slot having a time duration shorter than a time duration of an active time slot; and changing from a first carrier frequency to a second carrier frequency after a predetermined time period.

This object is also achieved in accordance with the present invention in an arrangement for digital radio transmission of data between a fixed station and at least one mobile station in a number of time slots using the time-division multiplex method, and at a number of carrier frequencies using the frequency-division multiplex method, said arrangement comprising: a fixed station having a first RF module for choosing a carrier frequency for transmitting during one of said time slots, and for changing from a first carrier frequency to a second carrier frequency during a predetermined time period on an order of magnitude of one time slot; at least one mobile station having a second RF module for choosing a carrier frequency for transmitting during one of said time slots, and for changing from said first carrier frequency to said second carrier frequency during said predetermined time period on an order of magnitude of one time slot; and a transmission time frame having active time slots in which data is transmitted, each of said active time slots being followed by an inactive time slot in which no data is transmitted, said inactive time slot having a time duration being shorter than that of a time duration of an active time slot.

Thus, according to the invention, a method is provided for digital radio transmission of data between a fixed station and at least one mobile station at one of a number of carrier frequencies. The data is in this case transmitted in time slots using a time-division multiplex method (TDMA). The change from one carrier frequency to another carrier frequency is in this case carried out in a predetermined time period.

The data is transmitted in active time slots, each of which is followed by an inactive time slot in which no data is transmitted. According to the invention, the time duration of the inactive time slot is shorter than that of the active time slot.

In particular, the time duration of the inactive time slot may be half that of the active time slot. This time slot structure allows more active links to be created per time frame, which results in more effective utilization of the bandwidth of the TDMA system.

A transmission time frame may, in particular, contain four active time slots for transmitting from the fixed station to the mobile station, as well as four time slots for transmitting from the mobile station to the fixed station.

The transmission can take place in a 2.4 GHz band.

Furthermore, an arrangement for radio transmission of data is provided according to the invention. The arrangement according to the invention has a fixed station and at least one mobile station, between which the data can be transmitted in a number of time slots using the time-division multiplex method (TDMA), and at a number of carrier frequencies using the frequency-division multiplex method (FDMA). The fixed station and the at least one mobile station each have an RF module, by means of which the carrier frequency for transmitting during one of the time slots can be chosen. In this case, the RF modules require a predetermined time duration in the order of magnitude of one time slot to change from one carrier frequency to another carrier frequency. According to the invention, a transmission time frame has active time slots in which data is transmitted, each followed by an inactive time slot, in which no data is transmitted. The time duration of the inactive time slot is, in particular, shorter than that of the active time slot. It is particularly advantageous if the time duration of the inactive time slot is half that of the active time slot. This makes it possible to ensure that more active links can be created during a time frame, and that the bandwidth is thus used more effectively.

A transmission time frame may contain four active time slots for transmitting from the fixed station to the mobile station, as well as four time slots for transmitting from the mobile station to the fixed station.

The carrier frequencies may be in a 2.4 GHz band.

The RF modules may, in particular, change the carrier frequencies during an inactive time slot.

These and other features of the invention(s) will become clearer with reference to the following detailed description of the presently preferred embodiments and accompanied drawings.

DETAILED DESCRIPTION OF THE
PRESENTLY PREFERRED EMBODIMENTS

Figure 1:
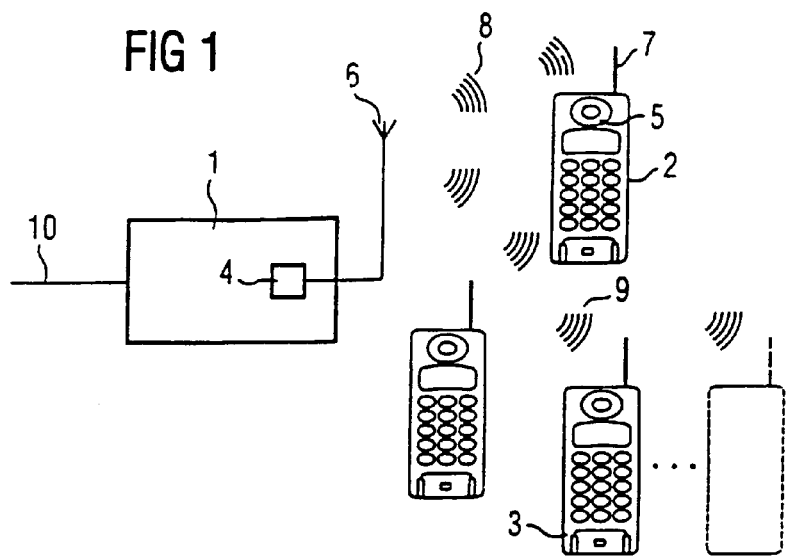
FIG. 1 is a block diagram of an arrangement according to the invention for digital radio transmission of data.

FIG. 1 shows an arrangement for digital radio transmission of data. A fixed station 1 is in this case connected to the fixed network (not shown) by means of a terminal line 10. The fixed station 1 has an RF module 4, with which data can be transmitted and received by means of an antenna 6. The RF module 4 may be, in particular, a so-called slow hopping RF module, that is to say a particularly cost-effective RF module, which intrinsically requires a certain period of time to change from one carrier frequency to another carrier frequency. This time period is in the order of magnitude of a time slot, that is to say between about 100 µs and 1 ms, and, in particular, between about 300 µs and 500 µs. This time period required for the carrier frequency change may correspond, for example, to the time period which is filled by a time slot in a time-division multiplex method (TDMA). By means of the antenna 6, a radio transmission may be made via a radio transmission path 8 to a mobile station 2, or a radio transmission may be made to a mobile station (cordless telephone) 3 via a second radio transmission path 9. All the mobile stations illustrated in FIG. 1 are of the same design, so that a more detailed explanation will be given only on the basis of the illustrated mobile station 2.

As can be seen in FIG. 1, this mobile station 2 has an antenna 7 for receiving and for transmitting data from and, respectively, to the fixed station 1. The mobile station 2 contains an RF module 5, which essentially corresponds to the RF module 4 used in the fixed station 1. The RF module 5 of the mobile station 2 may thus also be a so-called slow hopping RF module.

Figure 2:
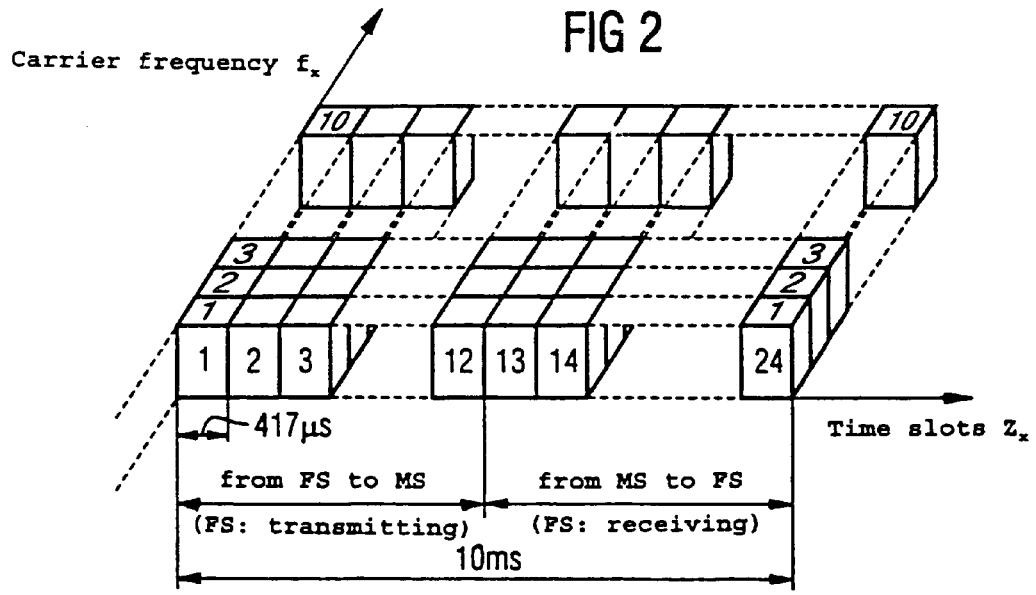
FIG. 2 shows a schematic illustration of the known DECT Standard.
Figure 3:
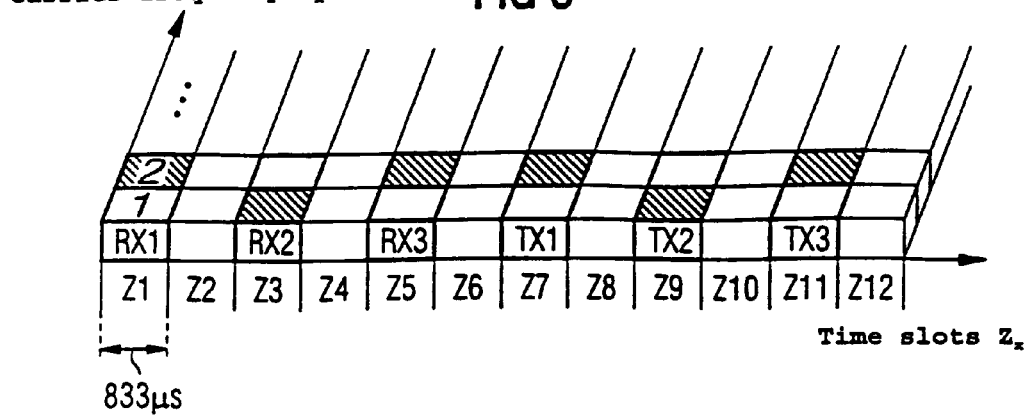
FIG. 3 shows a schematic illustration of the channel allocation for matching the known DECT Standard to the American ISM band.

It is now intended to explain, with reference to FIG. 2, how the known DECT Standard can be matched to the American ISM band. As already mentioned above, if the DECT Standard were retained, the resulting data rate would be too high for the ISM band. As can be seen in FIG. 3, the number of time slots per frame is for this reason halved, that is to say only 12 time slots Z1–Z12 are now provided in the ten milliseconds of a time frame instead of the 24 time slots (channels) in the DECT Standard, each of which 12 time slots can be used to transmit 480 bits. By halving the number of time slots, the data rate is also halved, in a corresponding manner, to (12×480 bits)/10 ms=576000 bits/s. This lower data rate results in a bandwidth that is acceptable for the American ISM band.

As can be seen, per se, in FIG. 3, it is necessary to provide so-called slow hopping RF modules in a cost-effective implementation of the equipment required for radio transmission, which means that each active time slot in which data is transmitted must be followed by an inactive time slot (blind slot), in which no data can be transmitted. If twelve time slots Z1–Z12 are provided (6 time slots Z1–Z6 for transmission from a mobile station to the fixed station and 6 time slots Z7–Z12 for transmission from the fixed station to a mobile station), then there is a maximum of only three possible links available. In an implementation using the cost-effective slow hopping RF modules, the usable channel capacity is thus not very great as a result of the regulation by the slow hopping RF module to a maximum of three links.

Possible active time slots are illustrated shaded in FIG. 3. For example, as illustrated, transmission from the fixed station 1 to a mobile station 2, 3 can be made at the carrier frequency $f_2$ in the time slot Z1 (RX1). If this time slot Z1 is followed by a time slot Z2, in which no data transmission takes place (inactive time slot, blind slot), a slow hopping RF module can also use the time duration of the inactive time slot Z2 to change the carrier frequency. As illustrated in FIG. 3, the carrier frequency can be changed, for example, from the carrier frequency $f_2$ to the carrier frequency $f_1$. Thus, as illustrated in FIG. 3, a transmission can be made in the time slot Z3 from the fixed station to a mobile station, at the carrier frequency $f_1$ (RX2). The layout shown in FIG. 3 is thus distinguished by the fact that, with the given time slot distribution, an active time slot (illustrated shaded) can be operated at each of the predetermined carrier frequencies ($f_1$, $f_2 \ldots$).

It should be remembered that, according to the DECT Standard, the organization of reuse of physical channels is carried out by means of dynamic channel selection, a channel being defined by its carrier frequency and its time slot. There is thus no need for any complex frequency planning, as in cellular systems. To set up links, the signal levels of all the channels are measured continuously, and the interference-free channels are controlled in a channel list (channel map). During a link, the signal levels of all the channels of all the possible carrier frequencies, and the reception quality, continue to be monitored.

Thus, as illustrated in FIG. 3, if it is found in the time slot Z1 when transmitting (RX1) at the carrier frequency $f_2$ that the reception or transmission conditions are better at the carrier frequency $f_1$, then it is possible to change, during the time duration of the time slot Z2 in which no data transmission takes place, to the carrier frequency 1 which has been identified as being better. The transmission RX2 takes place during the time slot Z3 at the carrier frequency $f_2$ which has been identified as being better.

As an alternative, a so-called frequency hopping method can also be used, in which the carrier frequency is changed after a predetermined time period, for example a transmission frame.

As already stated, the channel allocation scheme illustrated in FIG. 3 has the disadvantge that, since the number of time slots per time frame is halved to 12, as a result of which the duration of a time slot is doubled to 833 µs, and as a result of the necessity for the inactive time slots after each active time slot, this results in only three possible links (three links from a fixed station to a mobile station and three links from a mobile station to a fixed station) being available, in contrast to the six possible links according to the DECT Standard.

Figure 4:
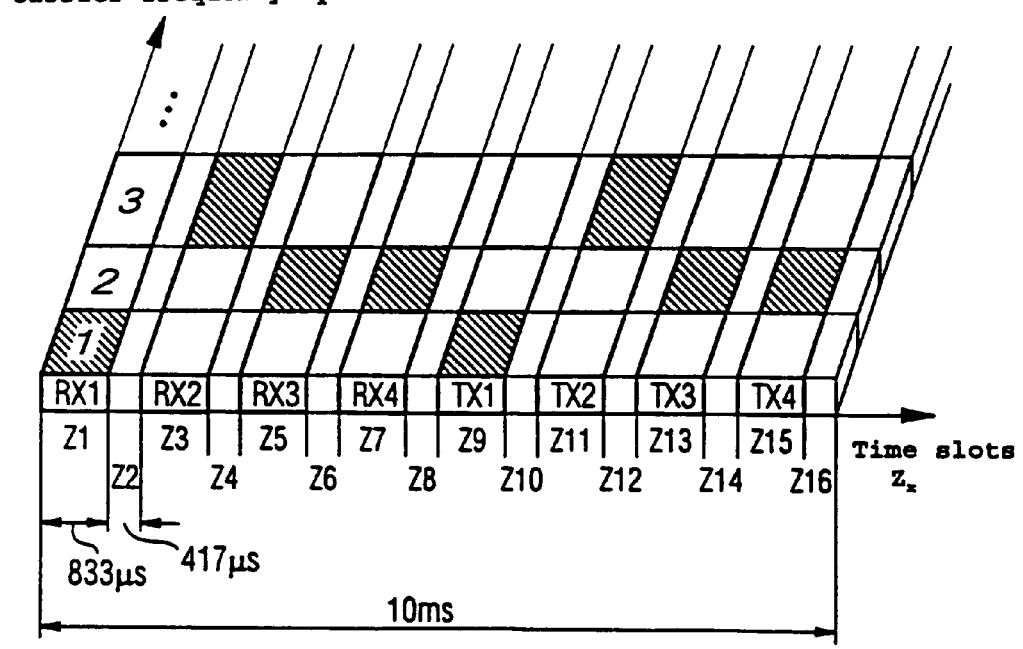
FIG. 4 shows a particularly effective allocation of the channels from the DECT Standard matched to the ISM band, according to the present invention.

FIG. 4 illustrates a time slot structure which allows the maximum possible number of links to be increased from three to four without there being any negative effect on flexible selection of the carrier frequencies from one active time slot to the next active time slot. As can be seen in FIG. 4, this increase in the maximum number of links from three to four is essentially achieved by the time duration of an inactive slot, during which no data transmission takes place, being shortened in comparison with the time duration of an active time slot. As is shown in FIG. 4, the time duration of an active time slot Z1, Z3, Z5, Z7, Z9, Z11, Z13 and Z15 in a time frame is in each case 833 ms, if the time frame lasts for 10 ms overall. The time duration of the inactive time slots Z2, Z4, Z6, Z8, Z10, Z12, Z14 and Z16 is only 417 µs, as illustrated in FIG. 4, and is thus essentially only half the time duration of the active time slots. A slow hopping RF module known from DECT technology requires a time period of at least 417 µs after an active time slot, in order to carry out frequency programming for the carrier frequency of the next time slot. Half a time slot of the DECT Standard matched to the ISM band, with a time duration of 833 µs/2=417 µs, is thus sufficient as an inactive time slot (blind slot).

As can be seen in FIG. 4, a data transmission RX1, for example, can be made during the time slot Z1 from the fixed station to a mobile station at a carrier frequency $f_1$. In order to allow the transmission to be made with a low bandwidth as well, the time duration of the time slot Z1 is in this case twice the time duration according to the DECT Standard, namely 833 µs. The time slot Z1 is followed by an nonactive time slot Z2, whose time duration is only 417 µs. This time period of 417 µs is intrinsically sufficient for an RF module using the slow hopping technique to program the carrier frequency for the next active time slot Z3. If it is thus found that, for example, the carrier frequency $f_3$ offers better reception conditions than the carrier frequency $f_1$, it is possible, during the time duration of the time slot Z2 during which no data transmission takes place, to change the carrier frequency from the carrier frequency $f_1$ in the time slot Z1 to the carrier frequency $f_3$ in the time slot Z3, and transmission from a fixed station to a mobile station can thus take place during the time slot Z3 (RX3).

The illustrated example shows the case where the carrier frequency fx is not changed for transmitting between a fixed station and a specific mobile station.

As an alternative, a so-called frequency hopping method can, of course, also be used, in which the carrier frequency is changed after a predetermined time period, for example a transmission frame.

After eight time slots Z1 to Z8, which correspond to half the time slots Z1 to Z16 in a time frame of 10 ms, the mobile station or stations transmit to the fixed station using the duplex method (TTD). For example, a mobile station can transmit (TX1) to the fixed station at a carrier frequency $f_1$ during the time slot Z9. The inactive time slot Z10 following the active time slot Z9 once again lasts for only half the time duration of the active time slot Z9 (833 μs), namely 417 μs. The time duration of the inactive half time slot Z10 is in turn sufficient for the RF module to carry out the frequency programming for the next active time slot Z11, for a further transmission from a mobile station to the fixed station (TX2).

The structure of the time slots ZX according to the invention thus allows more efficient use to be made of the time frame for digital transmission in the TDMA system, without this resulting in any loss of flexibility in the choice of the carrier frequencies.

Although modifications and changes may be suggested by those of ordinary skill in the art, it is the intention of the inventors to embody within the patent warranted hereon all changes and modifications as reasonably and properly come within the scope of their contribution to the art.

We claim:

1. A method for digital radio transmission of data between a fixed station and at least one mobile station at one of a number of carrier frequencies, said method comprising:

transmitting data in a number of time slots using a time-division multiplex method, said data being transmitted in active time slots, wherein each of the active time slots is followed by an inactive time slot in which no data is transmitted, said inactive time slot having a time duration shorter than a time duration of an active time slot; and changing from a first carrier frequency to a second carrier frequency after a predetermined time period having an order of magnitude of one time slot, wherein changing from the first carrier frequency to the second carrier frequency is performed during the inactive time slot by a RF module, wherein a transmission frame has at least four active time slots for transmission from said fixed station to said mobile station and at least four time slots for transmitting from said mobile station to said fixed station.

2. The method according to claim 1, wherein a time duration of an inactive time slot is half that of a time duration of an active time slot.

3. The method according to claim 1, wherein said data is transmitted using a time-division multiplex duplex method.

4. The method according to claim 1, wherein said data is transmitted in a 2.4 GHz band.

5. An arrangement for digital radio transmission of data between a fixed station and at least one mobile station in a number of time slots using the time-division multiplex method, and at a number of carrier frequencies using the frequency-division multiplex method, said arrangement comprising:

a fixed station having a first RF module for choosing a carrier frequency for transmitting during one of said time slots, and for changing from a first carrier frequency to a second carrier frequency during a predetermined time period on an order of magnitude of one time slot, for choosing the first carrier frequency for transmitting the data during one of the time slots and for changing the carrier frequency during an inactive time slot;

at least one mobile station having a second RF module for choosing a carrier frequency for transmitting during one of said time slots, and for changing from said first carrier frequency to said second carrier frequency during said predetermined time period on an order of magnitude of one time slot, and for changing the carrier frequency during the inactive time slot; and a transmission time frame having active time slots in which data is transmitted, each of said active time slots being followed by the inactive time slot in which no data is transmitted, said inactive time slot having a time duration being shorter than that of a time duration of an active time slot.

6. The arrangement according to claim 5, wherein said time duration of said inactive time slot is half that of said duration of said active time slot.

7. The arrangement according to claim 5, wherein said transmission frame comprises four active time slots for transmitting from said fixed station to said mobile station, and four time slots for transmitting from said mobile station to said fixed station.

8. The arrangement according to claim 5, wherein said carrier frequencies are in a 2.4 GHz band.

* * * * *